United States Patent [19]

Opprecht

[11] 4,214,140
[45] Jul. 22, 1980

[54] RESISTANCE WELDING MACHINE FOR SEAM WELDING OF BLANKS OR THE LIKE

[76] Inventor: Paul Opprecht, Im hintern Bernold, 8962 Bergdietikon, Switzerland

[21] Appl. No.: 943,296

[22] Filed: Sep. 18, 1978

[30] Foreign Application Priority Data

Oct. 27, 1977 [CH] Switzerland ............... 13069/77

[51] Int. Cl.² .................. B23K 31/06; B23K 11/06
[52] U.S. Cl. ........................ 219/61.3; 219/61.13; 219/81; 228/17.5
[58] Field of Search ................ 219/61.3, 61.4, 64, 219/81, 82, 61.13; 228/17.5

[56] References Cited

FOREIGN PATENT DOCUMENTS

| 1022719 | 1/1958 | Fed. Rep. of Germany | 219/81 |
| -199312 | 12/1957 | Netherlands | 219/81 |
| 429982 | 8/1967 | Switzerland | 219/64 |

Primary Examiner—B. A. Reynolds
Assistant Examiner—Keith E. George
Attorney, Agent, or Firm—Werner W. Kleeman

[57] ABSTRACT

A resistance welding machine for seam welding blanks or bodies or the like, comprising a guide device arranged in front of the electrode rolls for producing an exactly determined overlapping of the edges of the blanks or bodies and for guiding the overlapped blank edges to the welding point between the electrode rolls. Adjustment of a movable section of the guide device aligns the guide device at the welding point.

10 Claims, 8 Drawing Figures

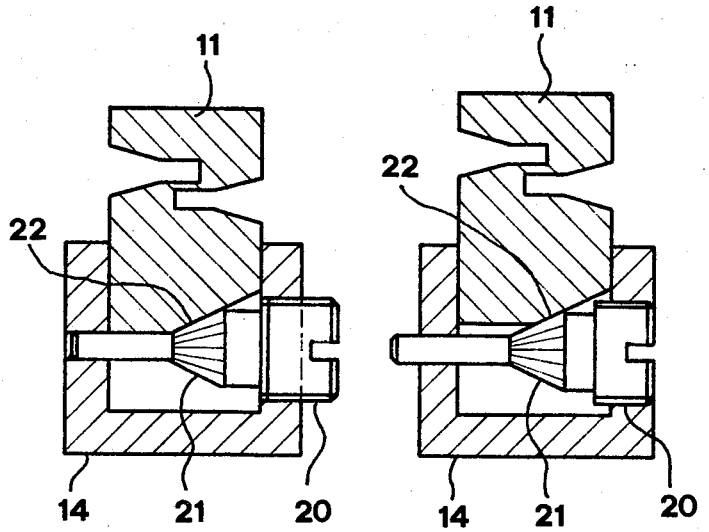

RESISTANCE WELDING MACHINE FOR SEAM WELDING OF BLANKS OR THE LIKE

BACKGROUND OF THE INVENTION

The present invention relates to a new and improved construction of a resistance welding machine for the seam welding of blanks or bodies, typically can bodies formed of sheet metal.

Generally speaking the resistance welding machine of the present development is of the type comprising a guide device arranged in front of the electrode rolls for producing an exactly fixed overlap of the edges of the blanks or bodies and for guiding the overlapped body edges to the weld point between the electrode rolls.

The welding rolls of seam welding machines must be machined after they have been used for a certain operating time, to insure that the electrode wire which travels thereon always is exactly guided.

Upon multiple machining of the welding rolls the radius thereof decreases more than one millimeter during the course of time. Consequently, there is always a shifting of the welding spot or point in relation to the body guiding means. specifically the overlapped body edges which enter the welding spot or point.

With conventional machines where there is utilized overlapping of the body edges by more than six times the gage or thickness of the sheet metal or plate, this slight displacement or shifting has little effect on the quality of the welded seam.

With the development of seam welding machines wherein the overlapping of the body edges is below six gage or thickness of the sheet or plate, even a very slight deviation of the welding spot or point from the ideal value leads to reduction in quality of the welded product, or, in fact, untight welding seams due to irregular overlapping along the blanks or bodies. The displacement of the overlapping body edges is caused by virtue of the fact that the overlapping, due to shifting of the welding spot, no longer tangentially merges therewith.

Therefore, attempts have already been made to overcome such shortcomings by inserting supports below the guide device. This work, however, requires much too much time and dexterity on the part of the operator, since with a one-time machining of the welding rolls there is removed only about 1/10 millimeter of material, so that the thickness of the support to be inserted amounts to less than 1/10 millimeters.

SUMMARY OF THE INVENTION

Hence, with the foregoing in mind it is a primary object of the present invention to provide a new and improved construction of resistance welding machine for seam welding of blanks or bodies, especially can bodies, in a manner not associated with the aforementioned drawbacks and limitations of the prior art proposals.

Another and more specific object of the present invention aims at the provision of a new and improved construction of apparatus by means of which it is possible to exactly align the guide device for the overlapped blank or body edges, after each machining, as by turning of the outside diameter of the electrode rolls or after replacement of the worn electrode rolls, exactly at the weld spot or point, without having to readjust infeed means for the unwelded blanks from the former apparatus to the guide apparatus to its new position.

Now in order to implement these and still further objects of the invention, which will become more readily apparent as the description proceeds, the invention contemplates providing adjustment means for aligning the guide device at the welding spot or point.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 6 and 7 are respective cross-sectional views of the guide device shown in FIG. 5, taken substantially along the line VI—VI thereof, illustrating different positions of such guide device; and FIG. 8 is a detail fragmentary sectional view of still another embodiment of guide device or mechanism constructed according to the teachings of the present invention.

DETAILED DESCRIPTION OF THE PREFERRED EMBODIMENTS

Figure 2:
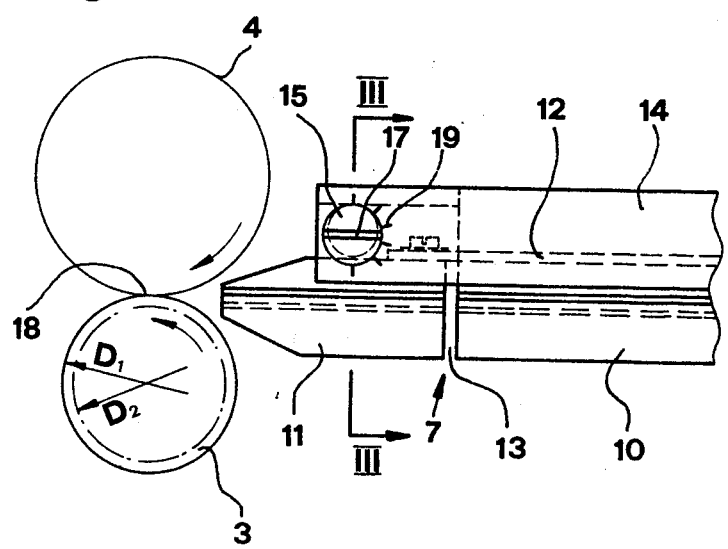
FIG. 2 is a detail fragmentary sectional view showing the guide device and both electrode rolls of the arrangement of FIG. 1.

Turning attention now to the drawings, it is to be understood that only enough of the resistance welding machine for seam welding of bodies or blanks, especially can bodies or blanks, typically formed of sheet metal, has been shown in the drawings as needed to understand the underlying principles and concepts of the invention and to simplify the illustration thereof. The exemplary embodiment of resistance welding machine for the seam welding of the bodies or blanks, sometimes referred to as can bodies or blanks, will be seen to comprise a machine frame 1, a stationary lower support or carrier arm 2 having an electrode roll 3, and a further electrode roll 4 which can be raised from the lower electrode roll 3 and is mounted at an upper support or carrier arm 5. Reference character 6 schematically illustrates a stack of sheet metal blanks and the blank roll former device which rolls the blanks into can bodies or the like. Between the roll former device 6 and the electrode rolls or rollers 3 and 4 there is arranged a conventional guide device or mechanism 7, also referred to in the art as Z-rails, which serve to overlap the rolled blank or body edges 8 and 9 and for infeeding the thus formed blanks or can bodies to the welding point or spot 18 between the welding rolls 3 and 4. Two merely schematically illustrated wire electrodes 3' and 4' are guided over the electrode rolls 3 and 4, respectively. To preserve clarity in illustration and inasmuch as the structure of the transport means for moving the rolled blanks along the Z-rail 7 does not constitute part of the subject matter of the present invention the same have been conveniently omitted. The Z-rail 7, as best seen by referring to FIG. 2, is sub-divided into two sections or parts 10 and 11. The section 10 is fixedly connected with the machine frame 1 and its arm 2. The section 11 is elastically hinged or articulated at the section 10, for instance by means of a spring steel bar or lamella 12 or equivalent structure. Between both sections or parts 10 and 11 there is left free a sufficiently large intermediate space 13 in order to insure for pivoting or rocking of the section 11.

Figure 3:
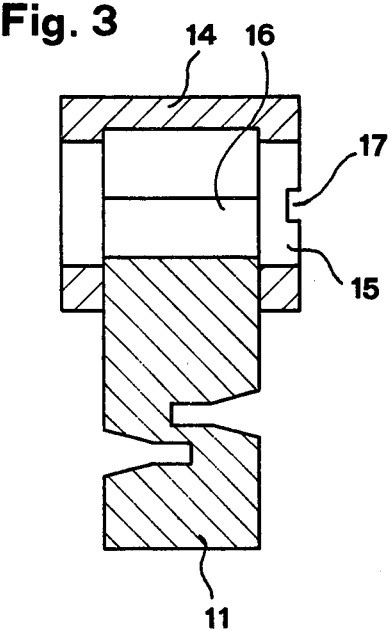
FIGS. 3 and 4 are respective cross-sectional views through the guide device together with the adjustment device or mechanism according to the showing of FIG. 2, taken substantially along the section line III—III thereof and showing different positions thereof.
Figure 4:
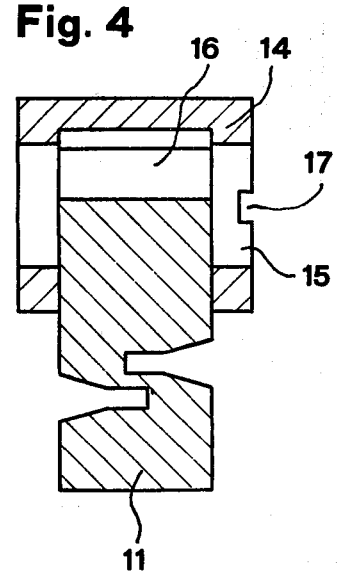
Figure 5:
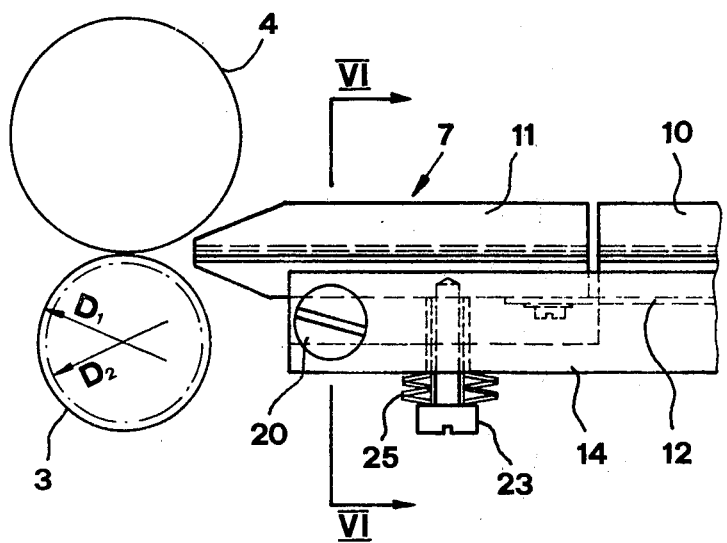
FIG. 5 is a detail fragmentary view of the guide device according to another embodiment of the invention.

An adjustment element 15 is inserted into a substantially U-shaped yoke 14 which is fixedly threaded or otherwise attached with the section 10 and constitutes an exact lateral guide means for the section 11. The adjustment element or device 15 has an eccentric intermediate piece or element 16 which bears upon the pivotal section or portion 11 of the Z-rail and can deflect such through the distance (D1–D2)/2, wherein D1 constitutes the diameter of the electrode roll 3 in its new condition, and D2 represents the diameter of the electrode roll 3 after having been turned or otherwise machined a number of times (FIGS. 3, 4 and 5). At the adjustment element or device 15 there is provided a slot 17 for the alignment of the Z-rail section 11 and the blank overlap which moves out of the Z-rail, at the welding point or spot 18 at the contact point (weld point) of the electrodes rolls 3 and 4 with one another. Suitable markings 19 or other indicia are provided at the yoke 14, by means of which it is possible to directly read the momentary position of the adjustment device 15 and thus the section 11 of the guide device 7 and on the basis thereof to adjust the guide device 7 without resorting to the aid of a measuring device.

According to another particularly advantageous embodiment of the invention, shown specifically in FIGS. 5, 6 and 7, the adjustment of the pivotal Z-rail section 11 is undertaken with the aid of a threaded bolt or screw 20 having a conical intermediate piece or element 21 at which bears a corresponding beveled portion 22 of the Z-rail 11. Furthermore, at the Z-rail section 11 there can be secured a threaded bolt or screw 23 which piercingly extends through the yoke 14 with sufficient play and clamps a package of plate springs 25 between the not particularly referenced head of the threaded bolt or screw and the yoke 14.

Figure 1:
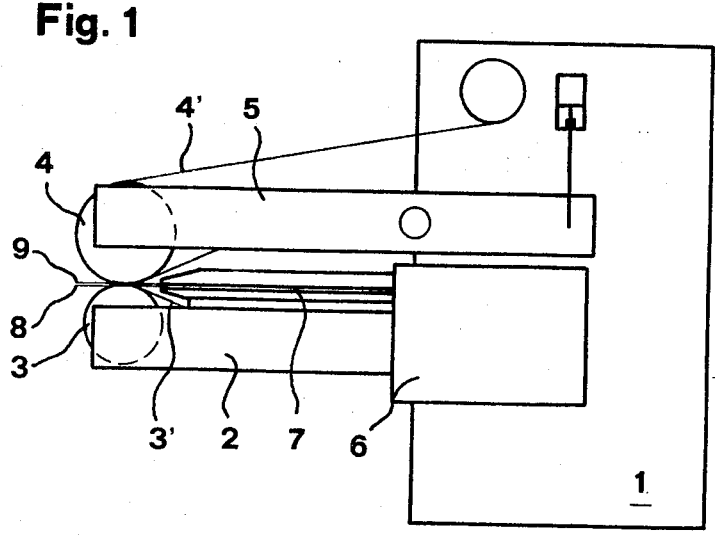
FIG. 1 is a schematic side view of a section of a resistance seam welding machine illustrating the upper and lower welding arms as well as the related welding-electrode rolls and a guide device or mechanism for the can bodies of blanks, typically formed of sheet metal by way of example.

By virtue of these measures, which also of course can be incorporated into the embodiment of FIG. 1, there is achieved the beneficial result that independent of the restoring force of the spring steel bar or lamella 12 there always acts a sufficiently large force upon the adjustment element 15 or the adjustment element 20, as the case may be, that there cannot arise any misadjustment thereof due to vibrations.

Finally, according to a further constructional embodiment of the invention as shown in FIG. 8 the adjustment of the Z-rail section 11 is achieved by an adjustment screw or bolt 26 or equivalent structure which bears perpendicularly at the section 11 and is guided in a threaded bore 27 of the yoke 14.

The described adjustment device is of course suitable both for seam welding machines having an electrode wire guided over the electrode rolls as well as for welding machines which perform without the use of a wire.

In summation it is believed worthwhile to indicate some of the more noteworthy advantages of the invention which can be enumerated, by way of example, as follows:

(a) extremely exact adjustment of the Z-rail at the welding point after each turning or other machining of the welding rolls without having to disassemble the Z-rail;

(b) adjustment can be accomplished with any suitable tool, such as typically a screwdriver, in accordance with the markings;

(c) simple, priceworthy and substantially maintenance-free construction;

(d) the equipment can be subsequently installed at existing resistance welding machines; and (e) at the weld point or spot there always prevail exactly the same conditions, and thus, there is afforded a uniform quality of the welding seam.

While there are shown and described present preferred embodiments of the invention, it is to be distinctly understood that the invention is not limited thereto, but may be otherwise variously embodied and practiced within the scope of the following claims.

Accordingly,

What I claim is:

1. A resistance welding machine for seam welding of blanks, comprising:
   a pair of cooperating electrode rolls for welding rolled blanks at a welding seam;
   a movable guide device arranged forwardly of said electrode rolls for producing an exact overlap at the edges of the rolled blanks and for guiding the overlapped blank edges to a welding point between the electrode rolls;
   said movable guide device comprising at least two relatively movable sections including a first section and a second movable section;
   said second movable section being located forwardly and in the vicinity of the welding point between the pair of cooperating electrode rolls;
   said first section being operatively associated with one of the electrode rolls; and
   adjusting means for aligning the movable second section of the guide device essentially at the welding point and independently of the first section.

2. The resistance welding machine as defined in claim 1, further including:
   means for pivotably mounting said movable second section of said guide means.

3. The resistance welding machine as defined in claim 1, wherein:
   said adjusting means comprises:
   a stationary guide yoke; and
   an eccentric disk mounted in said stationary guide yoke and pivoting said movable second section of said guide device.

4. The resistance welding machine as defined in claim 1, wherein:
   said adjusting means comprises a substantially conically configured portion having a lengthwise axis and movable in the direction of its lengthwise axis; and
   said conically configured portion being effective at said movable second section of said guide means.

5. The resistance welding machine as defined in claim 1, further including:
   clamping means for fixedly clamping the movable second section of said guide device at the adjusting means.

6. The resistance welding machine as defined in claim 1, further including:
   a guide yoke;
   said adjusting means comprising an adjustment screw guided in said guide yoke and effective in a direction of movement of the movable second section of said guide device at said guide yoke.

7. The resistance welding machine as defined in claim 1, further including:
   a guide yoke for laterally guiding the movable second section of said guide device.

8. The resistance welding machine as defined in claim 1, wherein:
   said first section is operatively connected with one of said electrode rolls; and
   said adjusting means enables movement of the movable second section independently of the first section and said one electrode roll.

9. The resistance welding machine as defined in claim 1, wherein:
   said adjusting means comprises spring means with which there is fixedly connected the movable second section of said guide device to enable movement thereof.

10. The resistance welding machine as defined in claim 9, wherein:
    said spring means comprises a spring steel bar.

* * * * *